(12) United States Patent
Freis et al.

(10) Patent No.: US 11,149,769 B2
(45) Date of Patent: Oct. 19, 2021

(54) INCREASED BOTTOM SHEET THICKNESS ON CAST ALLOYS FOR MECHANICAL JOINING OF CERTAIN MATERIALS

(71) Applicant: Ford Global Technologies, LLC, Dearborn, MI (US)

(72) Inventors: Amanda Kay Freis, Ann Arbor, MI (US); Vladimir Bogachuk, West Bloomfield, MI (US); Aindrea Campbell, Beverly Hills, MI (US); Jason Balzer, Commerce Township, MI (US); Kim Lazarz, Ypsilanti, MI (US); Joy Hines Forsmark, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 389 days.

(21) Appl. No.: 14/689,196

(22) Filed: Apr. 17, 2015

(65) Prior Publication Data

US 2016/0303640 A1 Oct. 20, 2016

(51) Int. Cl.
*F16B 5/04* (2006.01)
*B21J 15/02* (2006.01)
*F16B 19/08* (2006.01)

(52) U.S. Cl.
CPC ............... *F16B 5/04* (2013.01); *B21J 15/025* (2013.01); *F16B 19/086* (2013.01)

(58) Field of Classification Search
CPC .......... F16B 5/04; F16B 19/086; B21J 15/025
See application file for complete search history.

(56) References Cited

U.S. PATENT DOCUMENTS

| | | | | | |
|---|---|---|---|---|---|
| 2,302,501 | A | * | 11/1942 | Mears | F16B 5/04 403/408.1 |
| 5,667,328 | A | * | 9/1997 | Hofle | F16B 5/04 403/282 |
| 9,249,816 | B2 | * | 2/2016 | Scott | B62D 65/02 |
| 2005/0133483 | A1 | * | 6/2005 | Hou | B23K 11/0066 219/118 |
| 2005/0224655 | A1 | * | 10/2005 | Guittard | B64C 1/06 244/133 |
| 2012/0180305 | A1 | * | 7/2012 | Bartig | F16B 19/086 29/525.06 |

(Continued)

OTHER PUBLICATIONS

Metal Reference Guide by Triple-S Steel Supply Co. (copyright 2011), relevant pages clipped/marked.*

*Primary Examiner* — Christopher M Koehler

(57) ABSTRACT

A system for attaching material stack-up layers of at least two layers together using mechanical fasteners is disclosed. The material stack-up comprises at least an upper layer and a lower layer. The lower layer has a relatively constant thickness equal to or greater than 4.0 mm or may have alternating thick and thin areas in which the thickness of the thick area is equal to or greater than 4.0 mm. A mechanical fastener attaches the upper layer and the lower layer and is inserted at least partially into the lower layer. The fastener is inserted into the thick area of the embodiment having alternating thick and thin areas. The lower layer may be any of a variety of materials, including magnesium or any other brittle material. The lower layer may also be a casting, such as a magnesium casting. The mechanical fastener may be any of fasteners, screws or bolts.

11 Claims, 5 Drawing Sheets

(56) References Cited

U.S. PATENT DOCUMENTS

| | | | |
|---|---|---|---|
| 2012/0258328 A1* | 10/2012 | Carlson | B21J 15/025 |
| | | | 428/583 |
| 2013/0273312 A1* | 10/2013 | Campbell | B32B 7/08 |
| | | | 428/137 |
| 2013/0336745 A1* | 12/2013 | Trinick | F16B 19/08 |
| | | | 411/501 |
| 2015/0183022 A1* | 7/2015 | Trinick | B21J 15/025 |
| | | | 29/524.1 |
| 2016/0332215 A1* | 11/2016 | Blacket | B21D 39/03 |
| 2018/0023607 A1* | 1/2018 | Rintelmann | B29C 66/72 |

* cited by examiner

INCREASED BOTTOM SHEET THICKNESS ON CAST ALLOYS FOR MECHANICAL JOINING OF CERTAIN MATERIALS

TECHNICAL FIELD

The disclosed inventive concept relates generally to the riveting of a workpiece. More particularly, the disclosed inventive concept relates to a system for increasing bottom sheet thickness in specific locations on certain material such as cast alloys to allow for the joining of brittle and non-ductile materials without cracking.

BACKGROUND OF THE INVENTION

The automobile manufacturing industry is constantly faced with new challenges in a wide array of areas including vehicle safety, reliability, durability and cost. Perhaps the greatest challenge faced by the automobile industry today is the need to improve fuel mileage to both decrease carbon emissions and increase fuel economy for both environmental and cost reasons, all without compromising safety, power or durability. In 2011, new fuel economy requirements were imposed that establish a US vehicle fleet average of 54.5 miles per gallon by 2025. As the industry moves to that target year fuel annual economy requirements will be ramped up for different-sized vehicles.

Efforts have been made to increase fuel economy for vehicles. These efforts can be divided into two approaches: the "supply" side and the "demand" side.

On the supply side attention is drawn to improving energy conversion efficiency through use of, for example, electric or hybrid-electric drive trains. In addition, new vehicle drive trains, including smaller engines and more efficient transmission having multiple gears and transfer cases, are being developed and employed. Other technologies, including start-stop and engine cylinder deactivation strategies, are also proving effective at decreasing fuel consumption. Improved transmissions with multiple gears are also important elements to increased fuel consumption efficiencies.

On the demand side weight reduction is key, though other aspects, such as improved aerodynamics and drag reduction, are also important. Conventional vehicles, particularly trucks, rely on steel components. For over 100 years the material of choice for most vehicles is steel. Today steel makes up about 60% of the average car by weight.

Despite the improvement in steel composition the weight of steel regardless of type remains significant. It is also possible to reduce vehicle weight when steel is used by reducing component thickness. However, at a certain point it is no longer practical to reduce steel thickness regardless of the steel grade used. The use of high strength steel or advanced, high strength steel does not improve the realization that there are limits to how much vehicle weight can be reduced by steel thickness reduction without compromising vehicle performance.

Thus as the automotive industry continues to focus on light weighting vehicles to meet customer expectations on fuel economy and CAFE requirements, interest in alternative materials including aluminum intensive vehicle applications has increased. This is because vehicle weight reduction is most directly accomplished through substituting lighter materials for currently used steel parts. However, a limited variety of materials are available as a substitute for automotive steel. One such material is carbon fiber which is both lightweight and strong.

While carbon fiber offers certain performance advantages, replacement of the steel body-in-white with carbon fiber is expensive and brings with it a relatively slow production process.

Accordingly, much attention is drawn to the use of aluminum which is about ⅓ the weight of steel. Aluminum is not a new material for automotive use and has been used as a material for castings for over 100 years. The use of aluminum not only provides weight reduction but also results in good crash performance. Research has shown that in collisions aluminum can perform as well as conventional steel and demonstrates the ability to absorb twice the crash energy per pound of mild steel, having good buckling and energy absorption characteristics.

In body-in-white structures, joining methods have traditionally relied on resistance-spot welding (e.g., in steel structures). In the case of aluminum intensive vehicles and other mixed metal joining applications, self-piercing rivet (SPR) technology prevails. One advantage of self-piercing rivet technology is that it is a high production volume assembly process. Further, it is compatible with an adhesive, where both methods can be used in conjunction.

The challenge often faced when using the self-piercing rivet to fasten together multiple layers relates to the type of material being fastened. This is particularly the case with the continued growth of the use of mixed materials. One material that is popular in mixed-material stack-ups is magnesium. Applications using magnesium continue to develop, specifically magnesium castings.

Behind iron and aluminum, magnesium is the third most widely used structural metal. Sometimes known as "the lightest metal," magnesium and magnesium alloys are often used in the die casting of parts. Its popularity in many industries is increasing due to its advantageous strength-to-weight ratio, thus improving fuel economy in aircraft and aerospace applications. In addition, magnesium in alloy form has been used in the automotive industry for some time. Applications of magnesium alloy in automobiles include frames, engine components and blocks, and bodies.

One concern for riveting of magnesium is the possibility of cracking formed on the button side of a mechanical joint. Magnesium is very brittle and often cracks if it is not formed at high temperatures. Cracks on the button side present two issues, corrosion as the joint is no longer water tight and fatigue life of the joint in service. Eliminating this cracking concern would increase the usage of magnesium in vehicles.

As in so many areas of vehicle technology there is always room for improvement related to the mechanical fastening of the materials through self-pierce riveting.

SUMMARY OF THE INVENTION

The disclosed inventive concept overcomes the problems associated with known systems for riveting a material stack-up in which a magnesium layer, such as a magnesium casting, may be used. However, while the disclosed inventive concept is directed to the riveting of material stack-ups that include magnesium as a component, it is to be understood that the disclosed inventive concept may be directed to other materials as well. As a non-limiting example, a layer of aluminum or an aluminum casting may be used.

The disclosed inventive concept provides a material stack-up comprising at least an upper layer and a lower layer. The lower layer may have a relatively constant thickness or may have alternating thick and thin areas. A mechanical fastener attaches the upper layer and the lower layer. If the lower layer has both thick and thin areas, the fastener is attached at least partially into the thick area of the lower layer. The area of the lower layer into which the fastener is attached has a thickness that is equal to or greater than 4.0 mm, regardless of whether or not the lower layer has a relatively constant thickness or has thick and thin areas.

The lower layer may be any of a variety of materials, including magnesium, aluminum, or any other brittle material. The lower layer may also be a casting, such as a magnesium casting or an aluminum casting. The mechanical fastener may be any of several fasteners, including fasteners (such as self-piercing rivets, blind rivets, or solid rivets), screws and bolts.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1A:
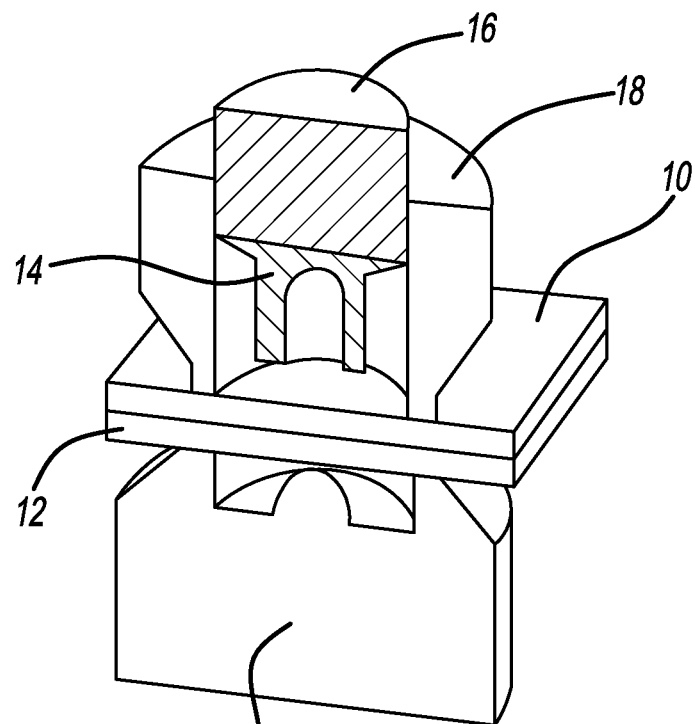
FIG. 1A is a schematic illustration of the first step of a self-piercing rivet process according to the prior art in which the blankholder and the punch are in position above the rivet prior to pressure being applied to the punch.

In the following figures, the same reference numerals will be used to refer to the same components. In the following description, various operating parameters and components are described for different constructed embodiments. These specific parameters and components are included as examples and are not meant to be limiting.

The disclosed inventive concept may find use in any number of applications where plural layers of the same or dissimilar materials are being attached. Accordingly, the disclosed inventive concept may be used in the production of automotive vehicles and trucks.

The use of self-piercing rivets in the assembly of plural components is a known technique as illustrated in FIGS. 1A through 1D. These figures schematically show steps involved in the self-piercing rivet process. As the rivet is inserted into the stack, the material deforms into the die and the resultant form is called a "button."

As illustrated in FIG. 1A, the first step of a self-piercing rivet process according to the prior art is illustrated. A first layer 10 is shown in position over a second layer 12. A rivet 14 is illustrated in position over the first layer 10. A punch 16 and a blankholder 18 are illustrated in position with the rivet 14 prior to pressure being applied to the punch 16. A die 20 is in position beneath the second layer 12.

Figure 1B:
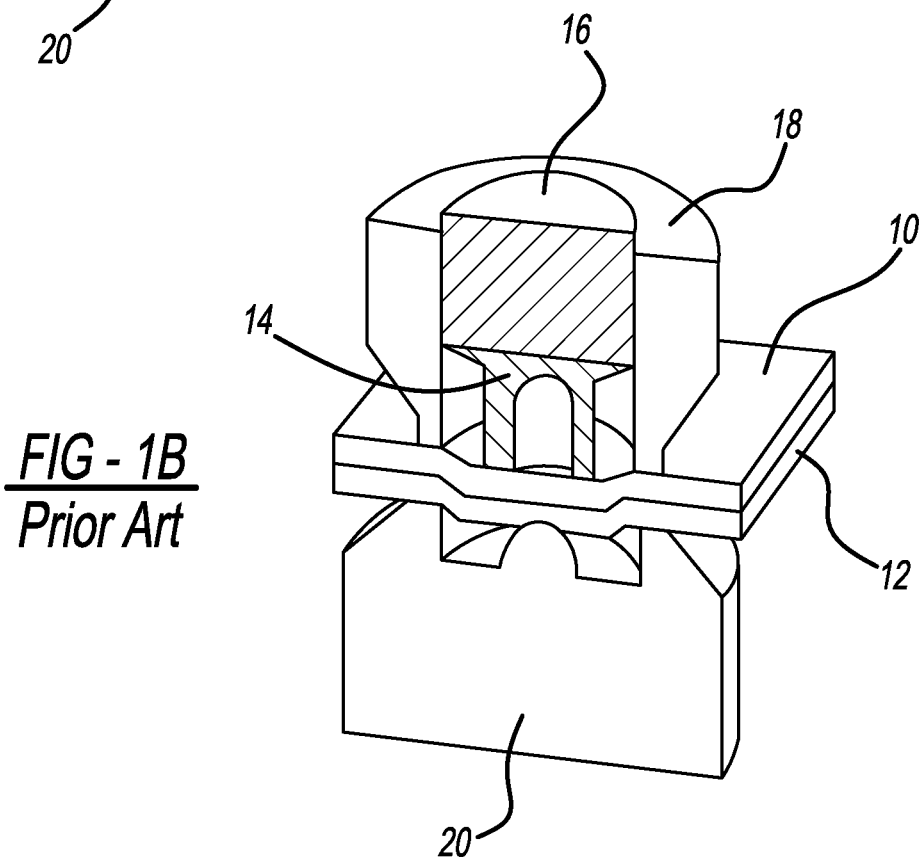
FIG. 1B is a schematic illustration of the second step of the self-piercing rivet process according to the prior art in which initial pressure has been applied to the punch.

In FIG. 1B, the second step of the self-piercing rivet process according to the prior art is illustrated. In this step, initial pressure has been applied to the punch 16 and the rivet 14 is shown beginning to deform the first layer 10 and the second layer 12.

Figure 1C:
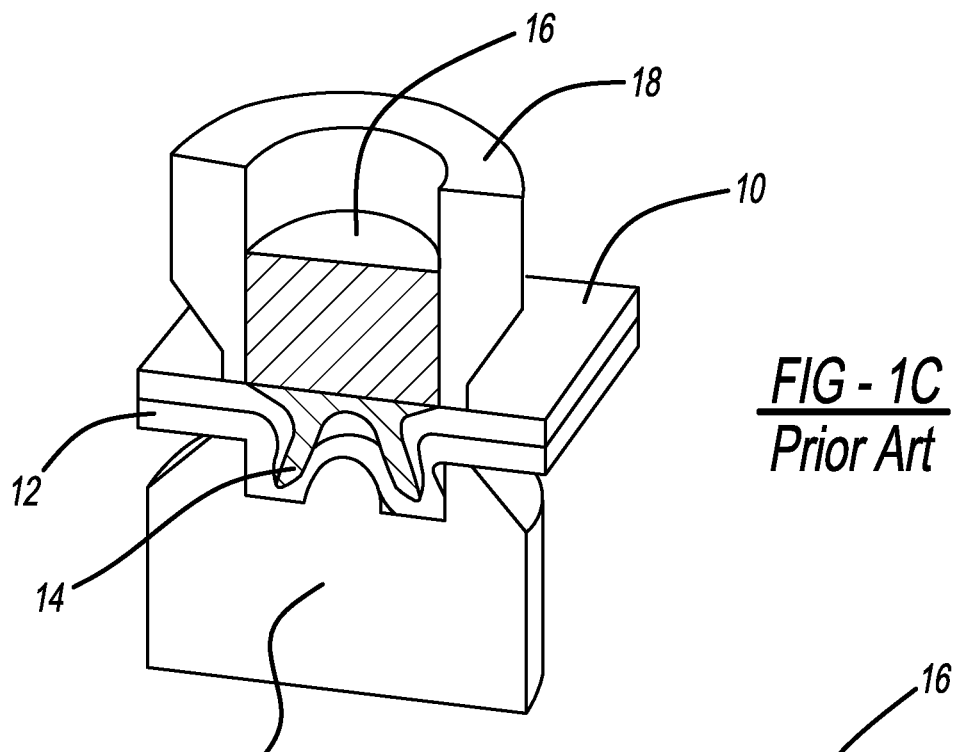
FIG. 1C is a schematic illustration of the third step of the self-piercing rivet process according to the prior art in which the rivet has pierced the upper layer and is interlocked into the lower layer.

In FIG. 1C, the third step of the self-piercing rivet process according to the prior art is illustrated. In this step, the punch 16 has been fully inserted through the blankholder 18 such that the rivet 14 pierced the first layer 10 and forms the second layer 12.

Figure 1D:
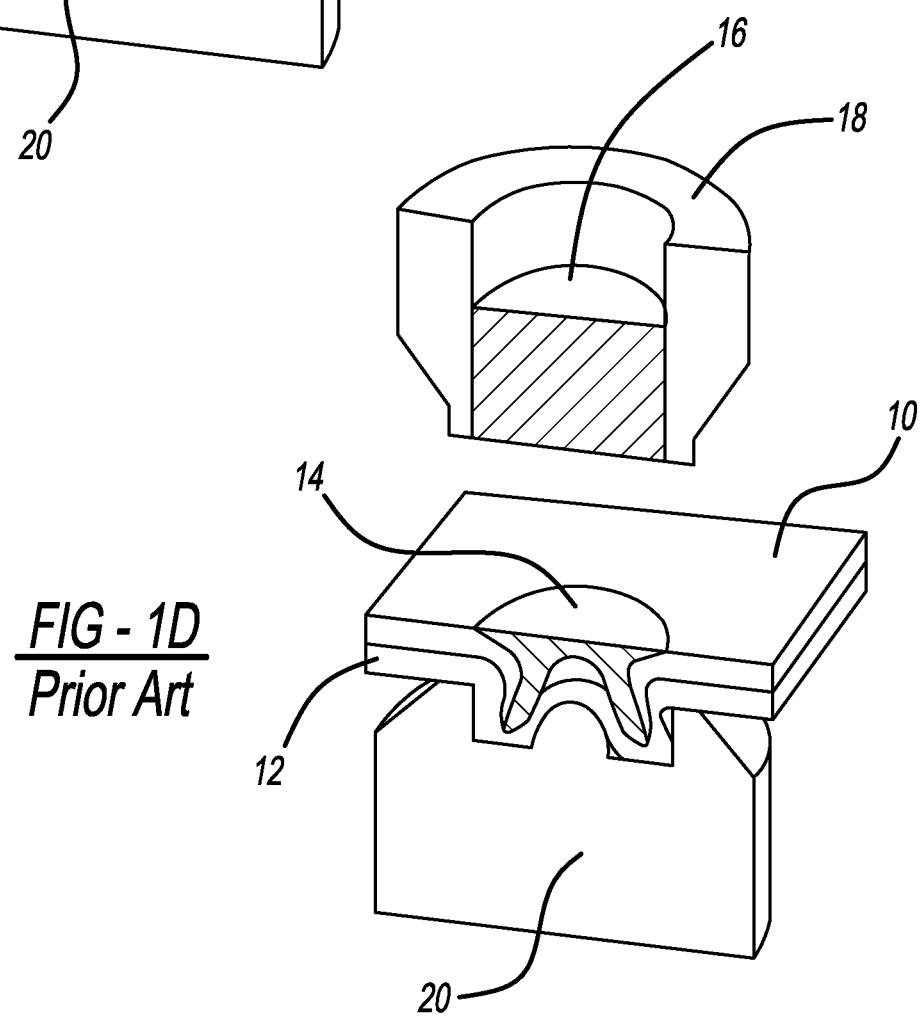
FIG. 1D is a schematic illustration of the fourth step of the self-piercing rivet process according to the prior art in which the rivet process has been completed and the punch and blankholder have been removed.

In FIG. 1D, the fourth step of the self-piercing rivet process according to the prior art is illustrated. In this step, the rivet 14 is shown fully inserted through the first layer 10 and a button is formed in the second layer 12. The punch 16 and the blankholder 18 have been moved out of contact with the first layer 10.

While a valuable mechanical fastener in many automotive and other assembly applications, use of the self-piercing rivet or other mechanical fasteners is occasionally challenged by the fact that the bottom layer of the material stack-up is often too thin and/or too brittle to prevent cracking in the resulting rivet button. This resulting cracking compromises the integrity of the fastener and is an undesirable result as illustrated in FIGS. 2A and 2B.

Figure 2A:
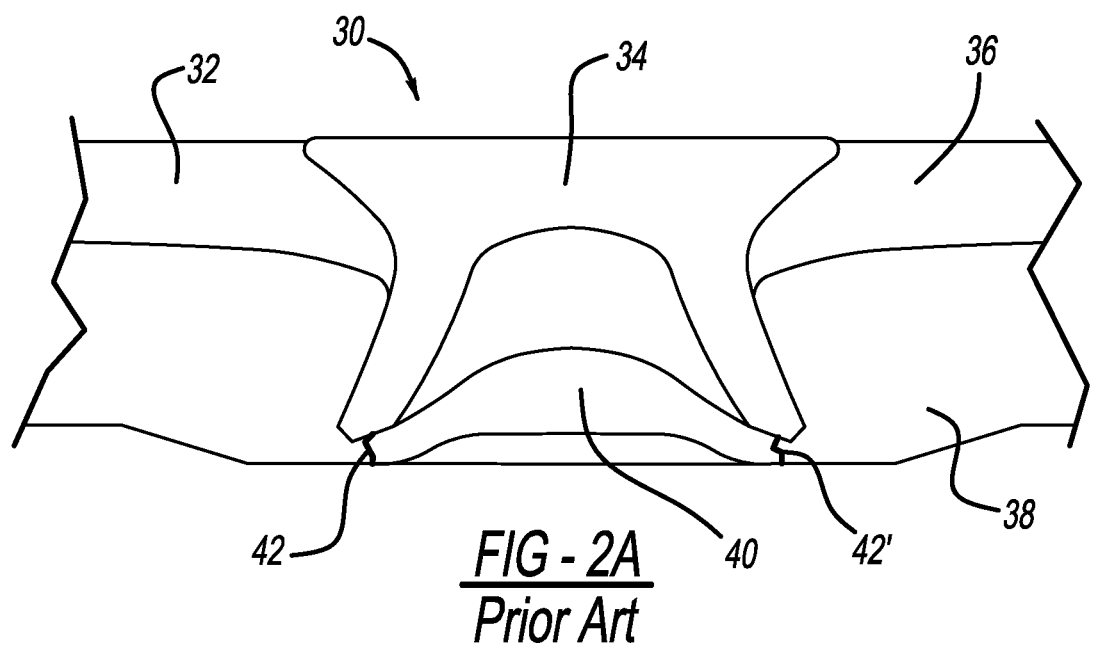
FIG. 2A is a cross-section view of a self-piercing rivet joint illustrating a relatively thin and cracked lower layer according to the prior art.
Figure 2B:
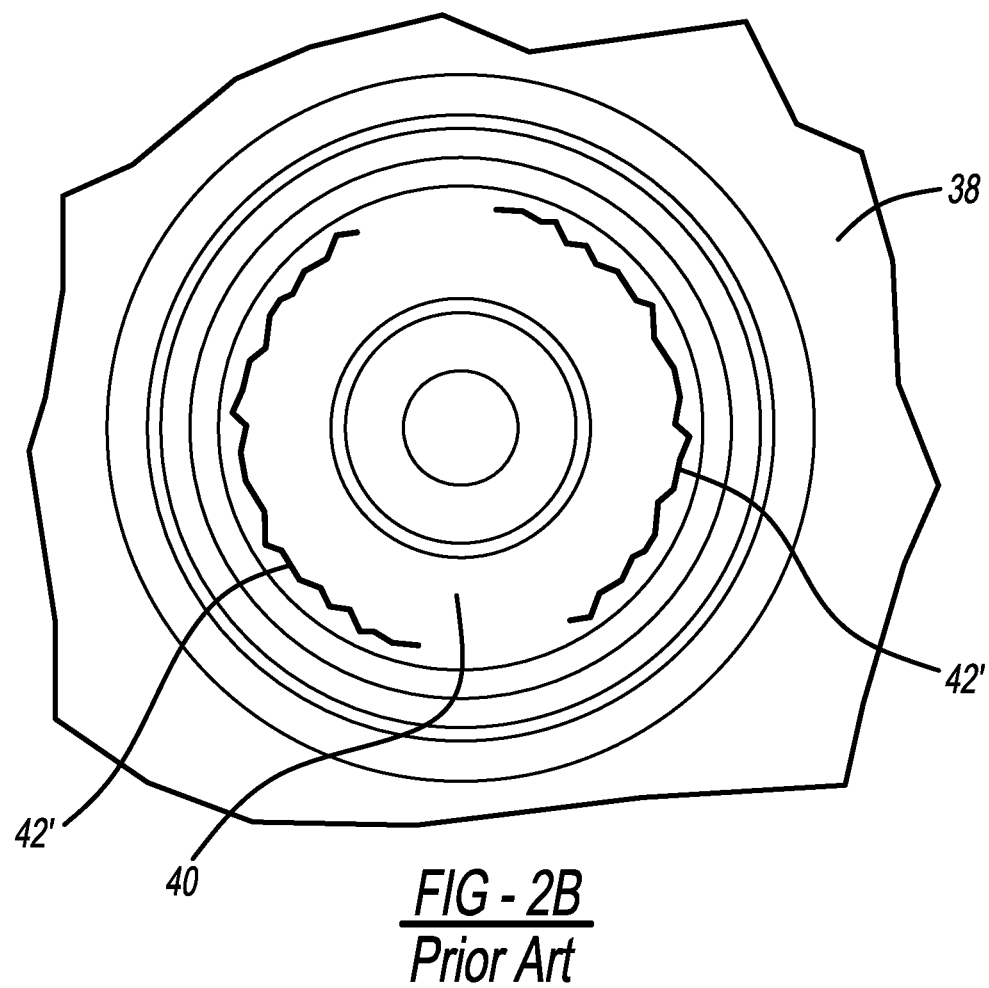
FIG. 2B is a plan view of the lower layer of FIG. 2A where circumferential cracks appear according to the prior art.

Referring to FIG. 2A, a cross-section view of a self-piercing rivet joint according to the prior art is shown and is generally illustrated as 30. The self-piercing rivet joint 30 includes a material stack-up 32 and a self-piercing rivet 34. The material stack-up 32 includes a first or upper layer 36 and a second or lower layer 38. The first or upper layer 36 may be of any type of metal, typically including aluminum or steel. The second or lower layer 38 is magnesium or magnesium alloy and is relatively thin, typically being about 2.0 mm in thickness. A rivet button 40 is illustrated, formed at the base of the self-piercing rivet 34.

When riveted, because of the relatively brittle nature of magnesium and magnesium alloy, the use of the self-piercing rivet 34 often results in cracks in the second or lower layer 38 in the rivet button 40. This cracked condition is illustrated by cracked areas 42 and 42' formed in the rivet button 40. The cracked condition defined by cracked areas 42 and 42' is shown more fully in FIG. 2B which is a plan view of the second or lower layer 38. This undesirable condition is very often the result of using self-piercing rivets through material stack-ups having a relatively brittle metal, such as magnesium or magnesium alloy, as a lower layer.

Correcting the situation requires removal of the damaged rivet, a time-wasting exercise that may result in damage to the material stack-up.

The system of the disclosed inventive concept remedies the problems of cracking encountered when rivets are used to attach two or more sheets of material to form a stack-up. The disclosed inventive concept provides a solution to the problems associated with the prior art which is to increase the thickness of the magnesium casting locally to where the mechanical fastener (such as rivets [including, but not limited to, self-piercing rivets], bolts and screws) are used to join two or more layers of material. The disclosed inventive concept reduces the strain along the formed button surface therefore reducing the possibility of crack formation.

Figure 3A:
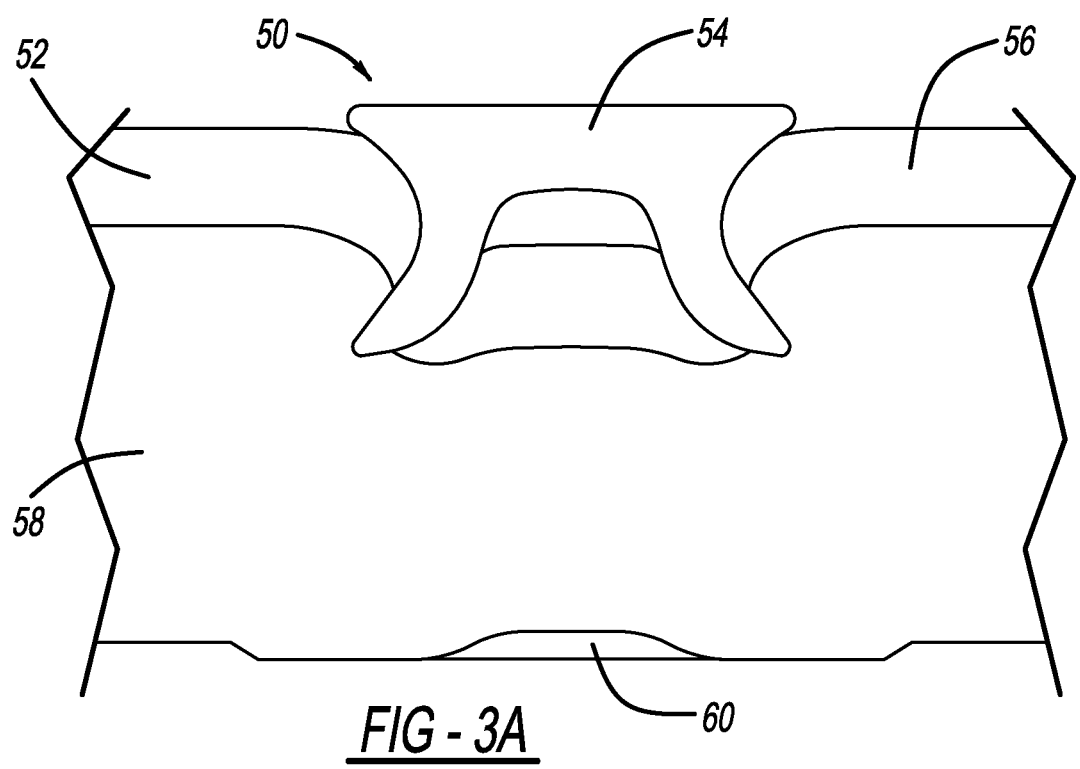
FIG. 3A is a cross-section view of a self-piercing rivet joint illustrating a bottom sheet that is thicker than the prior art in strategic locations to prevent cracking of the rivet button according to the disclosed inventive concept.

Referring to FIG. 3A, a cross-section view of a self-piercing rivet joint, generally illustrated as 50, is shown. According to the disclosed inventive concept, the self-piercing rivet joint 50 includes a material stack-up 52 and a self-piercing rivet 54. It is to be understood that while a self-piercing rivet 54 is illustrated, other mechanical fasteners, including but not limited to other types of rivets (hollow or solid), screws and bolts may be used to achieve the fastening of the material stack-up 52.

The material stack-up 52 includes a first or upper layer 56 and a second or lower layer 58. The first or upper layer 56 may be of any metal, including but not limited to aluminum or steel. The second or lower layer 58 is magnesium, magnesium alloy, or any other brittle material. The second or lower layer 58 may also be any other cast alloy, such as aluminum. A rivet button 60 is formed upon attachment of the self-piercing rivet 54.

Figure 3B:
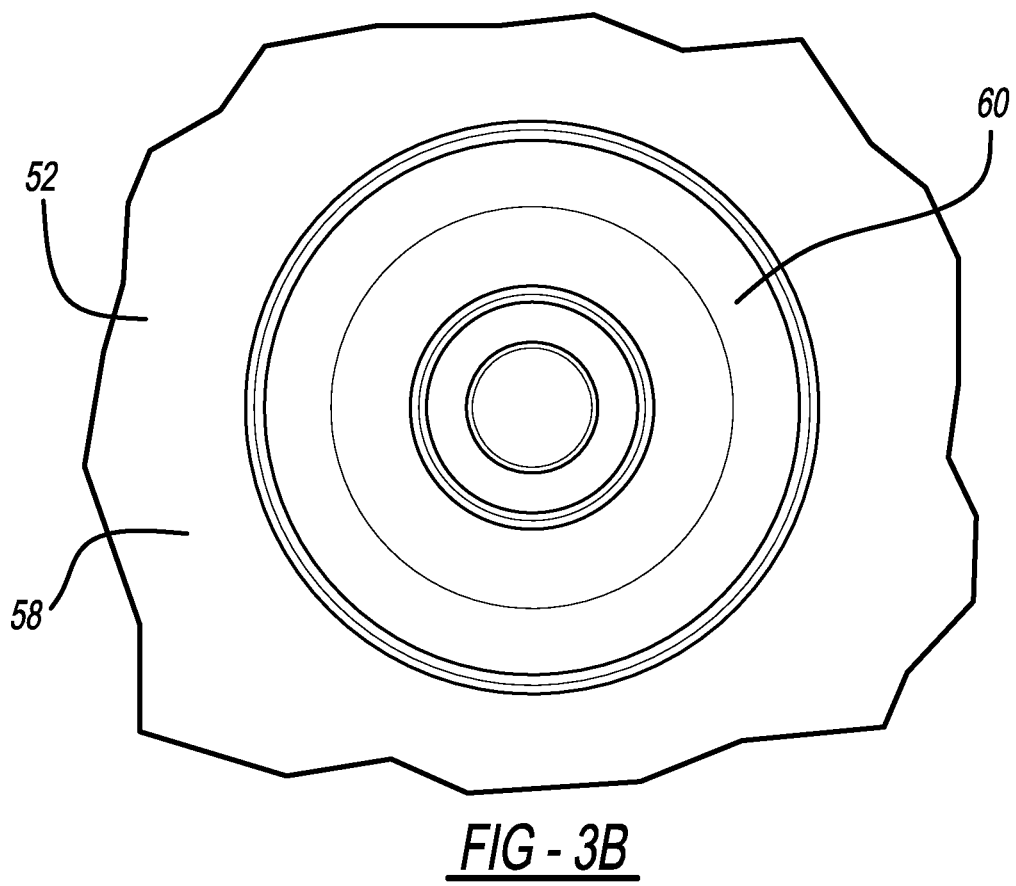
FIG. 3B is a plan view of the bottom sheet of FIG. 3A where no circumferential cracks appear in the rivet button based on the system of the disclosed inventive concept.

As shown, the second or lower layer 58 is relatively thick when compared with the thickness of the first or upper layer 56 and with the overall length of the self-piercing rivet 54. Without limitation, the thickness of the second or lower layer 58 in the area of where the self-piercing rivet 54 passes may be equal to or greater than 4.0 mm, thus providing sufficient thickness to prevent cracking of the rivet button 60. The absence of a crack or other material defect in the rivet button 60 is illustrated in FIG. 3B which is a plan view of the second or lower layer 58 shown in FIG. 3A.

Figure 4:
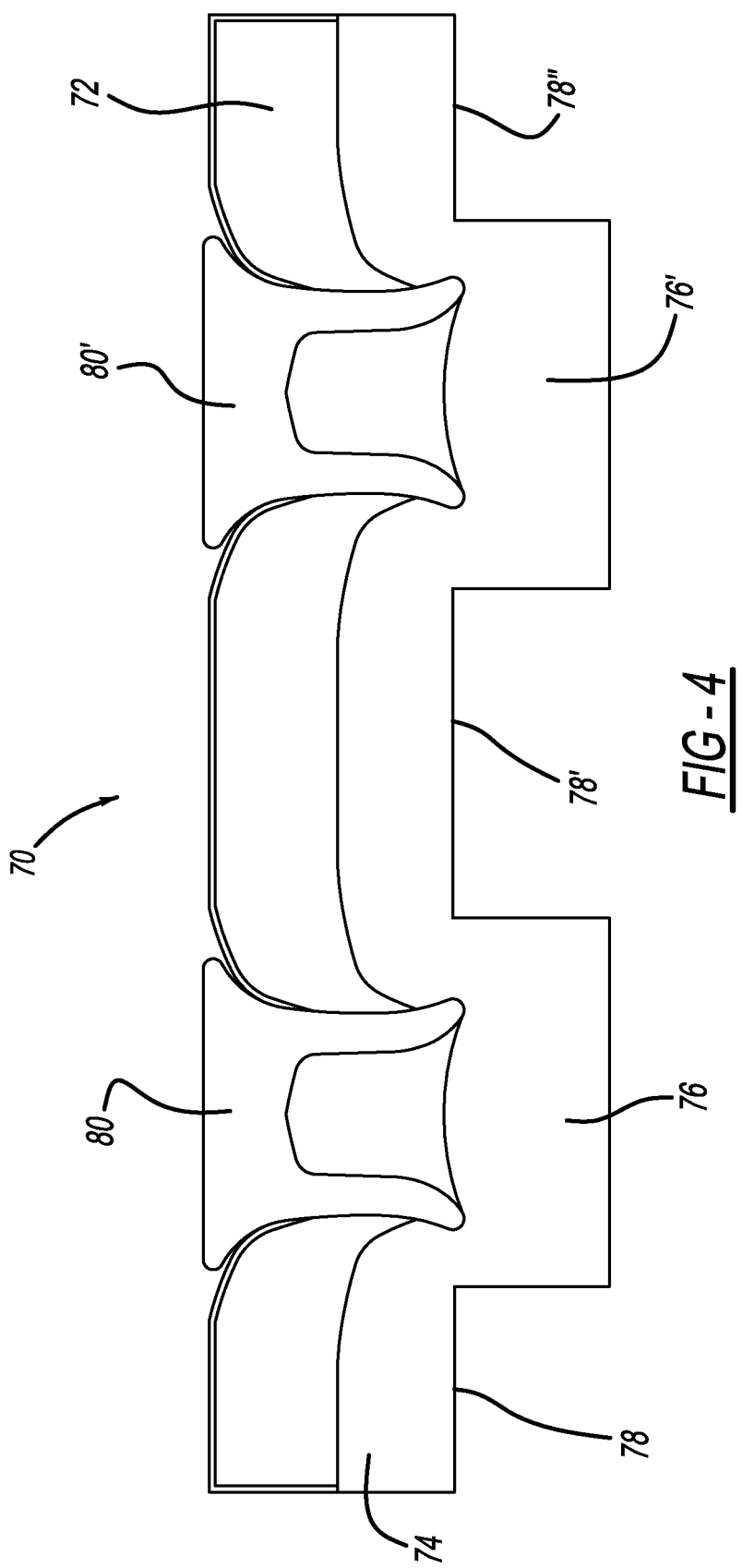
FIG. 4 is a diagrammatic cross-section view of a material stack-up in which the lower layer has thickened locations strategically formed to reduce strain along the button forming surface and thus minimizing the risk of cracking based on the system of the disclosed inventive concept.

As noted above, the layer of the stack-up into which the fastener is inserted, the lower layer, may have a relatively constant thickness or may have alternating thick and thin areas as shown in FIG. 4. If the lower layer is a relatively constant thickness, then its thickness is equal to or greater than 4.0 mm. If the lower layer is defined by alternating thick and thin areas, the thickness of the thick area (the "button" area or that area into which the fastener is inserted) is equal to or greater than 4.0 mm. Accordingly, and regardless of the embodiment, the fastener, such as but not limited to a self-piercing rivet, is inserted into the lower layer that is thick enough to eliminate concern of the resulting button being cracked when the riveting process has been completed. FIG. 4 illustrates the strategically-located thickened areas of the lower layer of the material stack-up according to one embodiment of the disclosed inventive concept which incorporates the optional alternating thick and thin areas.

More particularly, and referring to FIG. 4, a diagrammatic cross section view of a material stack-up, generally illustrated as 70, is illustrated. The material stack-up 70 includes a first or upper layer 72 and a second or lower layer 74. The first or upper layer 72 may be of any metal, including but not limited to aluminum or steel. The second or lower layer 74 is magnesium, magnesium alloy, or any other brittle material. The second or lower layer 74 may also be any other cast alloy, such as aluminum.

The second or lower layer 74 of the embodiment shown in FIG. 4 optionally includes thicker areas 76 and 76' alternatingly separated by thinner areas 78, 78' and 78". The thicker areas 76 and 76' are equal to or greater than 4.0 mm in thickness and are formed during the casting process by a relatively simple and low-cost modification of the die. The additional thickness reduces the strain along the rivet button-forming surface thus reducing the likelihood of cracking. It is to be noted that the thickness, shape and spacing of the thicker areas 76 and 76' relative to the first or upper layer 72 and the thinner areas 78, 78' and 78" illustrated in FIG. 4 are only suggestive and are not intended as being limiting.

Mechanical fasteners such as self-piercing rivets 80 and 80' attach the first or upper layer 72 to the second or lower layer 74 at the thicker areas 76 and 76'. Fastened in these thicker areas, the rivet buttons are not likely to crack.

An advantage of the system of the disclosed inventive concept is that it enables greater application of material joining through the use of mechanical fasteners, such as self-piercing rivets. This is particularly the case with magnesium and mixed material joining, insofar as prior to this solution, magnesium joining in the rivet button was considered infeasible unless the magnesium was heated prior to joint formation. The system of the disclosed inventive concept allows the magnesium or any other brittle material to be joined to other materials to form a material stack-up at room temperature.

For at least the above reasons the disclosed invention as set forth above overcomes the challenges faced by known methods for riveting brittle or non-ductile materials without concern over fastener cracking. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A method for attaching layers of material together to form a stack-up comprising:
   forming a rivet having a shank, said rivet having an upper end and a lower end, said shank defining said lower end of said rivet, said rivet having a long axis formed between said upper end and said lower end, said shank tapering outward and away from said long axis;
   forming an uppermost layer of said stack-up;
   forming a lowermost layer of said stack-up, said lowermost layer composed of magnesium or magnesium alloy, said lower layer being thicker than said uppermost layer, said lowermost layer having adjacent solid, thick areas separated by thin areas, said solid, thick areas of said lowermost layer having a thickness of at least 4.0 mm, said lowermost layer having an upper end; and
   at room temperature, inserting self-piercing rivets through said uppermost layer and into each of said adjacent solid, thick areas of said lowermost layer,
   whereby said shank of each of said rivets extends only partially into said lowermost layer and causes deformation of said lowermost layer around said shank thereby forming a concavity in said upper end of said lowermost layer, said concavity having sloped walls that terminate in a base beneath said shank, said deformation further defining a slope being at least partially conformed to said taper of said shank.

2. The method for attaching layers of material together of claim 1, wherein said adjacent solid, thick areas of said lowermost layer have a thickness equal to or greater than 4.0 mm and said thin areas that separate said adjacent solid, thick areas of said lowermost layer are less than 2.0 mm in thickness.

3. The method for attaching layers of material together of claim 1, wherein said lowermost layer is a casting.

4. The method for attaching layers of material together of claim 1, wherein each of said layers has a stiffness, said stiffness of said uppermost layer being equal to or less than said stiffness of said lowermost layer.

5. A system for attaching material layers comprising:
a stack-up having an uppermost layer and a lowermost layer, said lowermost layer being magnesium or magnesium alloy, said lowermost layer having an upper end, each of said layers having a stiffness, said stiffness of said uppermost layer being equal to or less than said stiffness of said lowermost layer, said lowermost layer having adjacent solid, thick areas separated by thin areas; and
self-piercing rivets that are inserted through said uppermost layer and into each of said adjacent solid, thick areas of the lowermost layer, each self-piercing rivet having a shank attaching said layers, each shank being only partially inserted into said adjacent solid, thick areas of said lowermost layer, each rivet having an upper end and a lower end, said shank of each rivet defining said lower end of each rivet, each rivet having a long axis formed between said upper end and said lower end, each shank tapering outward and away from said long axis,
wherein said self-piercing rivets cause deformation of said lowermost layer around said shank of each rivet thereby forming a concavity in said upper end of said lowermost layer, said concavity having sloped walls that terminate in a base beneath each shank, said deformation further defining a slope being at least partially conformed to said taper of each shank, each rivet forming a button in said lowermost layer and below said self-piercing rivets.

6. The system for attaching layers of material together of claim 5, wherein said adjacent solid, thick areas have a thickness equal to or greater than 2.0 mm and said thin areas that separate said adjacent solid, thick areas are less than 2.0 mm in thickness.

7. The system for attaching layers of material together of claim 5, wherein said lowermost layer is a casting.

8. A system for attaching material layers comprising:
a stack-up having an uppermost layer and a lowermost layer, said lowermost layer being magnesium or magnesium alloy, said lowermost layer having an upper end, said lowermost layer having adjacent solid, thick areas separated by thin areas prior to attachment to said uppermost layer; and self-piercing rivets that are inserted through said uppermost layer and into each of said adjacent solid, thick areas of said lowermost layer, each self-piercing rivet having a shank attaching said uppermost layer and said lowermost layer, each shank of said self-piercing rivets being inserted only partially into each of said adjacent solid, thick areas of said lowermost layer, each rivet having an upper end and a lower end, each shank defining said lower end of said rivets, each rivet having a long axis formed between said upper end and said lower end, each shank tapering outward and away from said long axis, wherein said self-piercing rivets cause deformation of said lowermost layer around each shank thereby forming a concavity in said upper end of said lowermost layer, each concavity having sloped walls that terminate in a base beneath each shank, said deformation further defining a slope being at least partially conformed to said taper of each shank.

9. The system for attaching layers of material together of claim 8, wherein each of said layers has a stiffness, said stiffness of said uppermost layer being equal to or less than said stiffness of said lowermost layer.

10. The system for attaching layers of material together of claim 8, wherein said lower layer is a casting.

11. The system for attaching layers of material together of claim 8, wherein each of said adjacent solid, thick areas have a thickness equal to or greater than 2.0 mm and said thin areas that separate said adjacent solid, thick areas are less than 2.0 mm in thickness.

\* \* \* \* \*